United States Patent [19]
Miller et al.

[11] 3,958,787
[45] May 25, 1976

[54] SLIPPING CLUTCH

[75] Inventors: Jeanette Mary Miller; Robert Eric Miller, both of Rose Bay, Australia

[73] Assignees: Victoria Alice Miller; Timothy Robert Miller, both of Rose Bay, Australia; part interest to each

[22] Filed: Aug. 19, 1974

[21] Appl. No.: 498,681

[30] Foreign Application Priority Data
Aug. 24, 1973 Australia............................ 4613/73

[52] U.S. Cl................................................ 248/183
[51] Int. Cl.²........................................ F16M 11/12
[58] Field of Search .......... 248/178, 179, 180, 181, 248/182, 183, 184, 185, 186; 188/77, 264 B, 83; 74/531

[56] References Cited
UNITED STATES PATENTS
2,530,294  11/1950  Evers.................................. 248/183
2,582,779  1/1952   Hoge................................... 248/183
3,123,330  3/1964   Forbes-Robinson................. 248/183
3,181,391  5/1965   Ivy...................................... 74/531
3,353,776  11/1967  Clemens............................. 248/183
3,661,376  5/1972   Hill et al............................. 248/183
3,712,571  1/1973   Miller et al......................... 248/183

Primary Examiner—James T. McCall
Assistant Examiner—Robert A. Hafer
Attorney, Agent, or Firm—Ladas, Parry, Von Gehr, Goldsmith & Deschamps

[57] ABSTRACT

The present invention relates to slipping pan clutches for cameras and the like, the clutch allowing slipping disengagement of the camera or the like from damped panning operation on a sudden or quick panning movement.

18 Claims, 5 Drawing Figures

SLIPPING CLUTCH

This invention relates to supports for cameras and the like mounted on tripods, pedestals and the like, and more particularly but not exclusively to an adjustable slipping pan clutch.

Conventionally such supports provide for tilting of the camera, that is rotation about an approximately horizontal axis and panning of the camera, that is rotation about an approximately vertical axis. It is important during tilting or panning that the movement of the camera should be fully controlled and smooth in order to prevent any undesirable irregular or jerky movements being reproduced by the camera.

Normally the moving parts of such supports are designed with a considerable degree of dampening, and this results in a significant torque being necessary to produce these movements. In certain instances it is desirable to be able to make a sudden and quick panning movement without detriment to the stability of movement during slow panning, where a well damped action is required.

The abovementioned requirements cannot readily and satisfactorily be met with conventional camera supports.

An object of the present invention is to provide a device substantially ree of the above disadvantages.

The present invention in one general form is a clutch comprising an outer member, an inner member, which inner member is located within the outer member and rotatable with respect to the outer member, and a brake band which is positioned within and between the outer member and the inner member, the brake band being attached to one of the members.

Preferably the brake is adjustable.

Some preferred embodiments of the present invention will now be described by way of example with reference to the accompanying drawings, in which.

Figure 1:
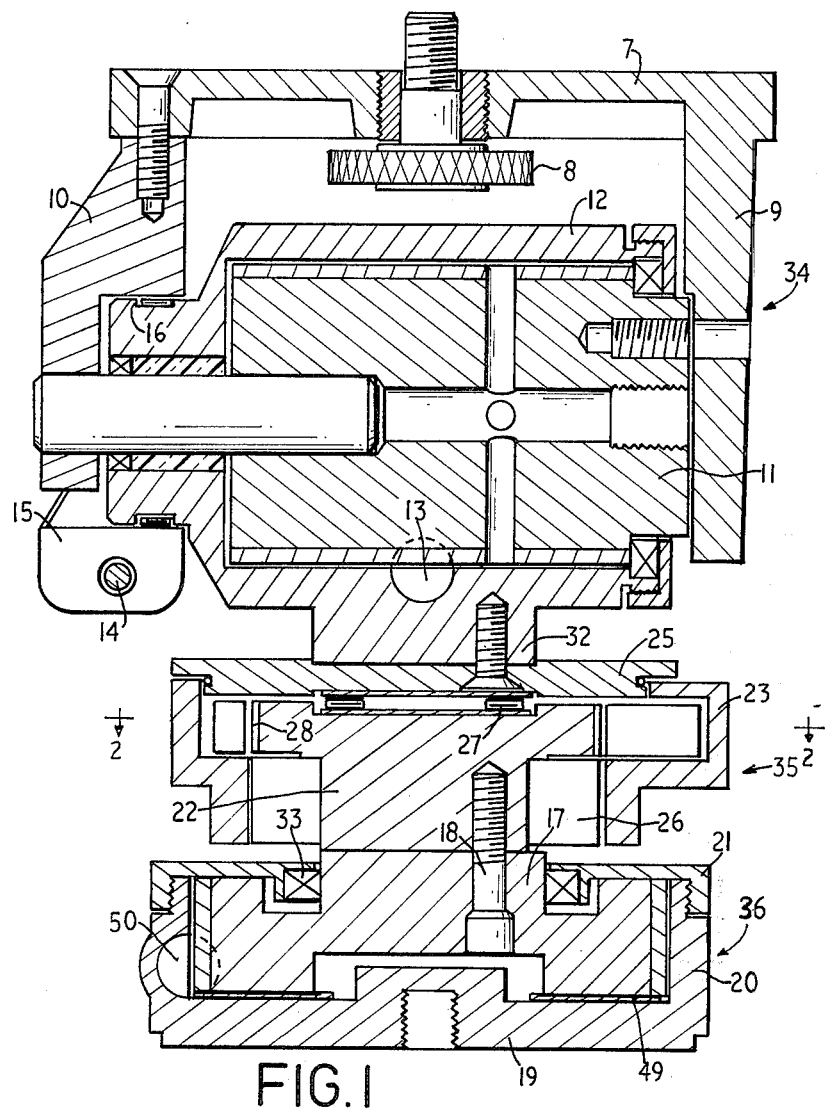
FIG. 1 is a sectional arrangement showing an adjustable slipping pan clutch, according to the present invention, attached to a camera tilt and panning head.

In FIG. 1 the numeral 34 generally denotes a camera tilt unit, numeral 35 a slipping pan clutch and numeral 36 a fluid panning suit.

A camera, instrument or any suitable equipment may be mounted on a mounting plate 7 and secured thereto by means of a screw 8. The mounting plate 7 is provided with a pair of arms 9 and 10, spaced apart and parallel to each other and secured near their ends to a tilt block 11, which rotates in a tilt cylinder 12. The tilt cylinder 12 is adapted to include a friction shoe 13, the position of which may be adjusted to cause the shoe to bear on the outside cylindrical surface of the tilt block 11, thereby controlling the braking and dampening effect on the rotational movement of the block. Alternatively, the tilt cylinder may be adapted to incorporate a hydrosstatic braking system. Locking of the position of the tilt arms 9 and 10 may also be achieved by means of a clamp arrangement 15 which is secured to one arm 10 and may be operated by means of screw 14 to grip a collar 16 which is formed integrally with the tilt cylinder 12.

In the absence of the slipping pan clutch 35, the tilt cylinder 12 of the tilt unit 34 may be secured directly to the pan unit 36, by means of screws 18. The pan unit 36 basically consists of a pan cylinder 20, spaced from and within which a pan block 17 may rotate. The space between the pan cylinder and block is filled with a hydraulic oil or other suitable fluid and is sized to provide a smooth and damped action when the cylinder and block are rotated with respect to each other. The pan cylinder 20 is provided with a cap 21 having a seal 33 to contain and prevent fluid leakage from the unit, the base 19 of which is adapted for mounting onto a tripod or other suitable means.

However, if the slipping pan clutch facility is required, the clutch unit 35 may be adapted for attachment to either the base 19 of the pan cylinder 20 which forms part of the pan unit 36, or between the tilt and pan units as illustrated in FIG. 1, or inverted if required.

Figure 2:
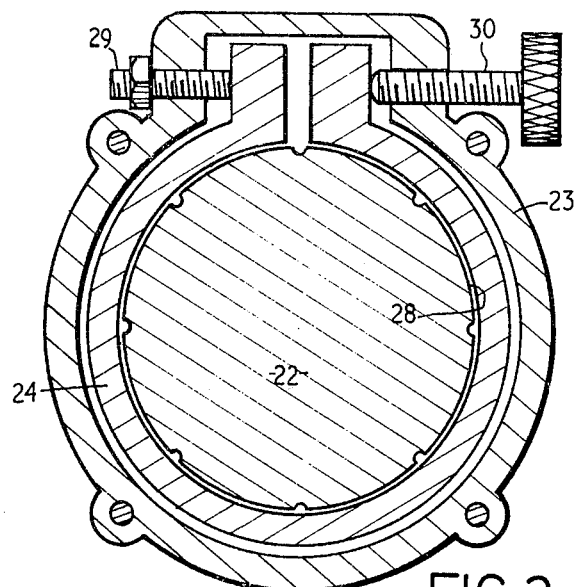
FIG. 2 is a sectional view of the slipping pan clutch along the line 2—2 in FIG. 1, illustrating a floating brake band.
Figure 3:
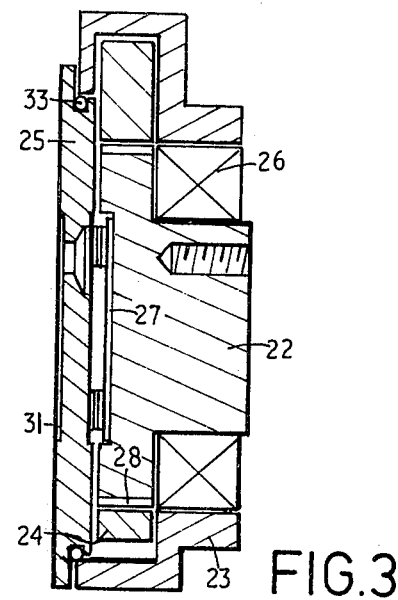
FIG. 3 is the sectional arrangement of the slipping pan clutch as shown in FIG. 1.

The slipping pan clutch 35 as illustrated in FIGS. 1 to 3 comprises an inner member or clutch centre portion 22, an outer member or body casting 23, a floating brake band 24, a cap 25 which is sealingly secured to the body casting 23.

The clutch centre 22 is provided with a support bearing 26, which is sealingly fitted in the body casting 23, and a thrust bearing 27 which bears against the cap 25. The braking surface 28 of the clutch centre 22 is provided with grooves for lubricant, which grooves are aligned parallel to the axis of rotation of the clutch centre. The floating brake band 24, illustrated in FIG. 2, is a split circular collar, the internal diameter of which is sufficient to allow some operating clearance between it and the clutch centre when assembled. The alignment and clearance of the brake band may be adjusted by means of a stop screw and lock nut 29 and an adjusting screw 30. The cap 25 is formed with a shallow locating socket 31 to receive a spigot portion 32 of the tilt cylinder 12.

The purpose of the slipping pan unit 35 is to permit a slipping disengagement between the pan and tilt units, dependent upon the degree of tightness of the brake band, to allow a sudden and quick panning movement without the stabilising effect of the fluid pan unit, but still retaining some stability between moving and fixed components 23 and 22 respectively. Upon reducing the pan movement operating torque, i.e. during slow panning movement, the slipping pan clutch again becomes a solid unit connecting the pan and tilt units 36 and 4 respectively. Further when the brake band is released the clutch unit 35 may be operated with substantially friction ree rotation movement and is not significantly affected by viscous drag. Also there is substantially no wobble of the clutch centre 22 with respect to casing 23 when the brake is free, this being due to the provision of rigid bearing supports 26 and 27. Further the brake band construction shown allows for substantial improvement of incremental control over the friction shoe type of brake 13, as illustrated in FIG. 1.

Figure 4:
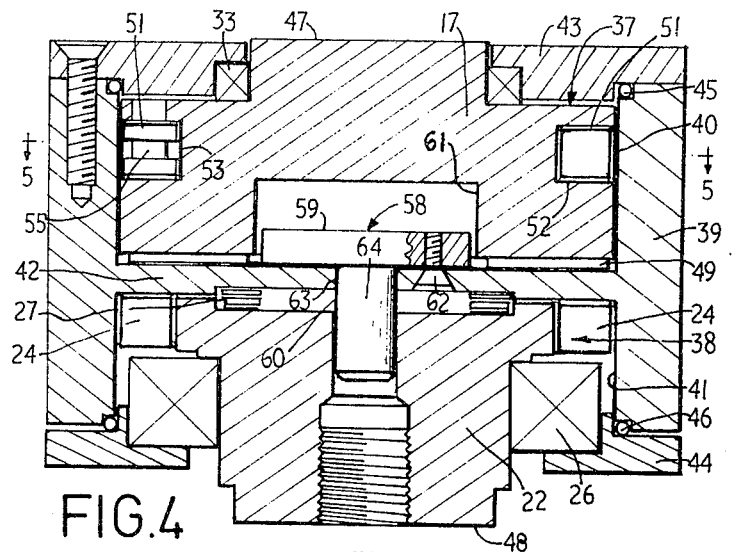
FIG. 4 is a sectional arrangement of a slipping pan clutch and panning head fabricated as in integral unit.

Referring now to FIG. 4, a panning 37 similar to that (36) shown in FIG. 1 and a slipping pan clutch 38 is illustrated as an assembly in a common or composite hoursing unit 39, common components being identified by common numerals. The housing unit 39 is provided with two coaxial bores 40 and 41 which are separated by a partition wall 42. The pan block 17 and clutch centre and its associated brake band 24 are sized and shaped to fit within bores 40 and 41 respectively with a clearance fit. Both the plan block and clutch centre bores 40 and 4 are provided with end caps 43 and 44 respectively having 0 ring seals 45 and 46. Also the pan block 17 and clutch centre 22 are each provided with a spigot portion 47 and 48 which extends through an aperture in their respective end caps for attachment to, for example, a tilt head 34 and tripod respectively. A thrust and mixing pad 49 having radial slots is located between the lower radial surface of the pan block and partition wall to provide an even oil film distribution therebetween. Both the panning head 37 and clutch unit 38 are filled with a suitable oil or lubricant. It will be appreciated that the clearances between rotating surfaces of the clutch units 35 and 38 are substantially greater than those of the panning unit in order to permit free operation of the clutch units when their brake bands 24 are fully released.

Figure 5:
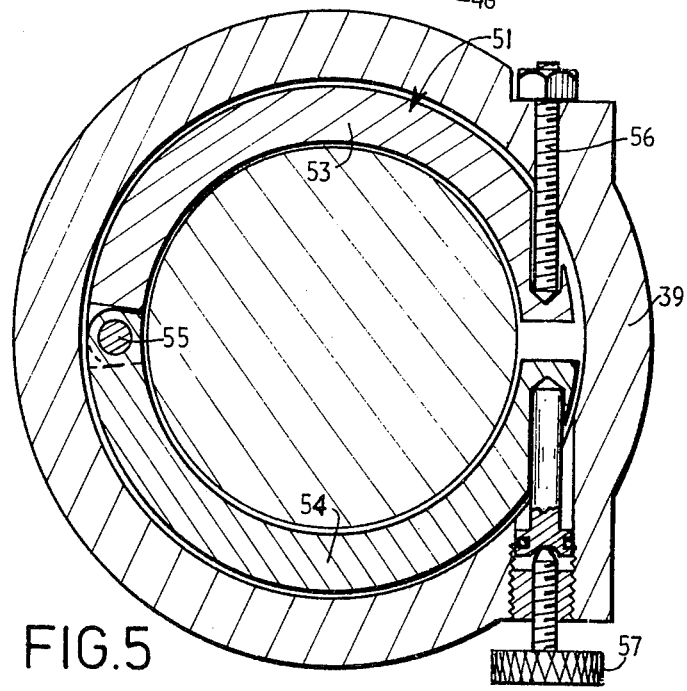
FIG. 5 is a sectional view of the panning head along line 5—5 in FIG. 4, illustrating a floating brake band.

It will be noted that the brake shoe 50 of the panning unit 36 of FIG. 1 has been omitted in unit 39 of FIG. 4. In its place a brake band 51 is provided and located in a circumference groove 52 in the pan block 17. As shown in FIG. 5, the brake band 51 is formed of two parts 53 and 54, which allows for assembly of the band in groove 52. One end of each part 53 and 54 is subsequently joined and locked together by means of pin 55, the parts of the band thus acting as a unitary member similar to brake bank 24 of the clutch unit 38. The alignment and clearance of the pan lock and friction band 53 is achieved by adjustment of stop and lock nut 56 and screw 57, which abut against the free ends of band 53.

Further there is incorporated in the unit of FIG. 4, an anti-tilt spigot 58 having a heat portion 59 and spigot portion 60. The head portion 59 is located within a recess 61 in the pan block 17 and is secured to the partition wall 61 in the pan block 17 and is secured to the partition wall 42 by screws 62 or any other suitable means. The spigot portion 60 extends through a hole 63 in the partition wall, which hole is coaxially aligned with the axis of rotation of both the pan block and clutch centre, and engages with a neat fit within a bore 64 of a bush of nylon or any other suitable material in the clutch centre 22.

Further it should be noted that bearing 26 may be of a type having an integral seal to prevent egress of lubricant from within the clutch units 35 and 38.

In normal use with the slipping pan clutch 35 or 38 secured to the pan unit 36 or 37 respectively, the brake band 24 is set to provide a required given braking pressure on the clutch centre 22 by adjustment of screw 30, which is preferably provided with a fine thread. The set braking pressure is sufficient to allow the clutch unit to operate as a solid coupling during slow panning movement, the panning torque being applied by an operator to an apparatus, which is supported on the panning unit. If the operator requires a faster panning movement, an increased torque is applied to the apparatus. However, on increasing the applied torque beyond a given torque, which is dependent on the setting of the brake band 24, the clutch slips and the subsequent toreque required to achieve quick panning movement is substantially reduced. Having traversed or panned the apparatus over a required distance, the operator may revert to a slow panning movement and on doing so the clutch unit again effectively becomes a solid coupling.

Accordingly it will be appreciated that automatic slipping disengagement and subsequent re-engagement of the apparatus to be panned with respect to the viscous pan unit, may be achieved without operation of any locking devices. Further, those skilled in the art will note that the brake band adjustment means (56 and 57) and (29 and 30) may be excluded and the brake band permanently set to provide the required slipping effect. However, in the preferred embodiment disclosed herein, the brake band may be fully released or locked to permit free panning operation or to respectively render the clutch unit inoperative, as required by the operator.

What we claim is:

1. A slipping clutch unit for attachment to a camera or instrument support head having viscous-fluid-damped tilt and panning bearings to permit quick panning or tilting movement of the camera or instrument, said clutch unit comprising an outer member, a substantially cylindrical inner member, which inner member is located within the outer member and rotatable with respect to the outer member, a substantially annular brake band which is positioned within and between the outer member and the inner member and engageable with the inner member, the band being radially split to provide at least two free ends, which are spaced apart from each other, adjustment means permitting the spacing between the free ends of the band to be varied and thereby causing the brake band to engage with the inner member, means restraining relative rotational movement of the band with respect to the outer member, and means restraining axial movement of the inner and outer members with respect to each other, the members being rotatable with respect to each other in a substantially friction-free manner when the brake band is fully released, whereby the clutch unit, upon engagement of the band with the inner member at a selected brake pressure, allows transmission of an applied torque between the members and, on said applied torque exceeding a given torque which is dependent upon the selected brake pressure, allows slipping disengagement of the members with respect to each other, whereupon said slipping disengagement is maintainable at an applied torque which is less than the given torque and thereby permitting a sudden and quick relative movement of the inner and outer members.

2. A clutch unit as claimed in claim 1 wherein the inner member comprises a disc having a substantially cylindrical edge surface, a coaxial spigot extending from one side of the disc through an aperture in the outer member for attachment to an apparatus or support.

3. A clutch unit as claimed in claim 2 wherein the inner member is mounted between a first bearing, which is located on the spigot of the inner member, and a second bearing being a thrust bearing, which is located between the other side of the disc and the outer member, said other side being remote from the spigot and said bearings being axially pre-loaded.

4. A clutch unit as claimed in claim 3 including a plurality of axial grooves in and radially spaced around said cylindrical edge surface of the inner member for lubricant.

5. A clutch unit as claimed in claim 4 wherein said adjustment means comprises a first stop connected to the outer member, a second adjustable stop connected to the outer member, the first stop engaging a first abutment at one free end of the band and the second adjustable stop engaging a second abutment at the other free end of the band.

6. In combination a slipping clutch unit and a viscous drag bearing unit; said clutch unit comprising an outer member, a substantially cylindrical inner member, which inner member is located within the outer member and rotatable with respect to the outer member, an annular brake band which is positioned within and between the outer member and inner member, the brake band being connected to and movable with one of the members, means permitting braking engagement of the band with the other of the members, the members being rotatable with respect to each other in a substantially friction-free manner when the brake is fully released and means restraining axial movment of the inner and outer members with respect to each other; and said viscous drag bearing unit comprising a substantially cylindrical bearing block, a housing within which the block is rotatably mounted with a neat clearance fit, means restraining axial movement of the block with respect to the housing, a viscous drag liquid between the surfaces of the block and the housing, sealing means maintaining the viscous drag liquid between said surfaces; said slipping clutch unit and said viscous drag bearing unit being coaxially mounted together, whereby said block is substantially coaxially aligned with said inner member.

7. The combination as claimed in claim 6 further including means permitting a braking force to be applied to the block with respect to the housing.

8. The combination as claimed in claim 7 including a thrust and mixing pad between the block and outer member.

9. The combination as claimed in claim 7 wherein said means permitting application of a braking force comprises a circumferential groove in the cylindrical surface of the block, an annular block brake band located within the groove, the block brake band being radially split to provide two free ends, which are spaced apart from each other in the absence of any constraint, and means permitting adjustment of the spacing between the free ends of the block brake band.

10. The combination as claimed in claim 9 wherein the block brake band is further split to form two segmental parts, the ends remote from the free ends of which are connectable to each other.

11. The combination as claimed in claim 6 wherein said outer member and said hosing are integrally connected together to form a composite housing.

12. The combination as claimed in claim 11 wherein said inner member and said block are axially spaced apart having a partition wall therebetween, the partition wall being integrally formed with said composite housing, and further including a bore in the inner member, which bore is coaxially aligned with the axis of rotation of the inner member, a pin connected to the partition wall and extending therefrom to engage within the bore in the inner member with a neat sliding fit.

13. The combination as claimed in claim 6 wherein the inner member comprises a disc having a substantially cylindrical edge surface, a coaxial spigot extending from one side of the disc through an aperture in the outer member for attachment to an apparatus or support and wherein the inner member is mounted between a first bearing, which is located on the spigot of the inner member, and a second bearing being a thrust bearing, which is located the other side of the disc and the outer member, said other side being remote from the spigot and said bearings being axially pre-loaded.

14. The combination as claimed in claim 13 including a plurality of axial grooves in and radially spaced around said cylindrical edge surface of the inner member for lubricant.

15. In combination a slipping clutch unit, a viscous drag tilt unit and a viscous drag pan unit; said clutch unit comprising an outer member, a substantially cylindrical inner member, which is located within the outer member and rotatable with respect to the outer member, an annular brake band which is positioned within and between the outer member and the inner member, the brake band being connected to and movable with the outer being rotatable with respect to each other in a substantially friction-free manner when the brake band is fully released and means restrainig axial movement of the inner and outer members with respec to each other; said pan unit and said tilt unit each comprising a substantially cylindrical block, a housing within which the block is rotatably mounted with a neat clearance fit, means restraining axial movement of the block with respect to the housing, a viscous drag liquid between the surfaces of the block and housing, sealing means maintaining the viscous drag liquid between said surfaces and means permitting a braking force to be applied to the block with respect to the housing; said tilt unit having means permitting attachment of an instrument or camera thereto; said pan unit and slipping clutch unit being coaxially mounted together to form an assembly, whereby said pan block is substantially coaxially aligned with said inner member, said assembly having means permitting attachment of said assembly to a support; and said tilt unit being mounted on said assembly with the axis of rotation of the tilt unit being aligned transversely with the axis of rotation of the pan unit.

16. The combination as claimed in claim 15 wherein an inner bore of said annular brake band is sized to receive therein the cylindrical inner member with a substantial clearance fit, the band being radially split to provide two free ends, which are spaced apart from each other in the absence of any constraint, and including means permitting adjustment of the spacing between the free ends of the band, whereby, upon adjustment of said spacing to cause engagement of the band with the inner member at a selected brake pressure, said inner member and said outer member of the clutch operate as a unitary member, during slow panning movement allowing transmission of an operating torque between the members and on said operating torque exceeding a given torque at commencement of a quick panning movement slipping disengagement of the clutch members occurs.

17. The combination as claimed in claim 16 wherein the inner member comprises a disc having a substantially cylindrical edge surface, a coaxial spigot extending from one side of the disc through an aperture in the outer member for attachment to an apparatus or support and wherein the inner member is mounted between a first bearing, which is located on the spigot of the inner member, and a second bearing being a thrust bearing, which is located between the other side of the disc and the outer member, said other side being remote from the spigot and said bearings being axially pre-loaded.

18. The combination as claimed in claim 17 including a plurality of axial grooves in and radially spaced around said cylindrical edge surface of the inner member for lubricant.

* * * * *